United States Patent [19]

Franck et al.

[11] 4,137,147
[45] Jan. 30, 1979

[54] PROCESS FOR MANUFACTURING OLEFINIC HYDROCARBONS WITH RESPECTIVELY TWO AND THREE CARBON ATOMS PER MOLECULE

[75] Inventors: Jean-Pierre Franck, Bougival; Edouard Freund, Rueil Malmaison; Christian Marcilly, Houilles; Jean Miquel, Paris, all of France

[73] Assignee: Institut Francais du Petrole, Rueil-Malmaison, France

[21] Appl. No.: 834,025

[22] Filed: Sep. 16, 1977

[30] Foreign Application Priority Data

Sep. 16, 1976 [FR] France .............................. 76 28245
Oct. 4, 1976 [FR] France .............................. 76 29992

[51] Int. Cl.$^2$ ...................... C07C 3/34; C10G 13/04; C10G 37/04
[52] U.S. Cl. ................................... 208/61; 260/683 R
[58] Field of Search .................... 208/61, 59, 683 R

[56] References Cited

U.S. PATENT DOCUMENTS

| | | | |
|---|---|---|---|
| 3,373,220 | 3/1968 | Hepp | 260/683 R |
| 3,617,486 | 11/1971 | Lewis | 208/59 |
| 3,898,299 | 8/1975 | Jones | 208/61 |
| 3,922,216 | 11/1975 | Wilson et al. | 208/61 |

*Primary Examiner*—Herbert Levine
*Attorney, Agent, or Firm*—Millen & White

[57] ABSTRACT

The present process has for object the manufacture of olefinic hydrocarbons with respectively 2 and 3 carbon atoms per molecule. This object is attained by treating a charge selected from such cuts as light or heavy naphthas, kerosenes and light gas oils of distillation point lower than 360° C. The cut is subjected to hydrogenolysis and the resulting $C_2$ and $C_3$ hydrocarbons are fed to a steam-cracking plant, while the $C_4^+$ hydrocarbons are subjected to further hydrogenolysis.

16 Claims, 2 Drawing Figures

PROCESS FOR MANUFACTURING OLEFINIC HYDROCARBONS WITH RESPECTIVELY TWO AND THREE CARBON ATOMS PER MOLECULE

The outstanding growth of petrochemistry, linked to industries producing plastics, synthetic fibers, synthetic rubbers, detergents and many other goods, requires each year increased amounts of raw materials.

The main raw material is ethylene, but propylene, butadiene, benzene, etc. are also involved; these basic materials are the building blocks of more complex organic molecules.

Acetylene has long been the most widely used base hydrocarbon, but its high production cost has lead to its progressive replacement by ethylene, propylene and butadiene, depending on the relative economics in each case. In spite of the high increase of the crude oil price, propylene and ethylene have retained their economic advantage with respect to acetylene.

Initially, in the 1930's, and during the last war, ethylene was recovered by liquefying and fractionating coke-oven gases, by dehydrating ethyl alcohol and even by partially hydrogenating acetylene. Propylene is an abundant byproducts obtained by cracking of oil fractions to gasoline, although ethylene is only present in minor amount.

As the ethylene and propylene demand increased, attention was progressively turned towards the cracking of oil fractions. In fact, catalytic cracking to produce gasoline yields 3 to 5% b.w. of propylene with a total amount of LPG of about 8 to 12%.

Since about 1920, ethylene and propylene have been obtained in the USA by cracking of ethane, propane, butane and natural gas.

These two olefins are also obtained by thermal cracking of heavy materials : gasoil is obtained, as well as a little gasoline, gas and coke. The resulting LPG may contain respectively 7 and 9% by volume of ethylene and propylene.

Yields over 15% by weight of propylene and over 30% by weight of ethylene are obtained by high temperature pyrolysis of naphtha and heavy petroleum fractions.

In the 1940's, British Celanese built the first gasoil vacuum cracking unit, which supplied the ethylene necessary to synthetize ethanol and acetic acid.

Later, in 1950, three important petrochemical complexes were built in the United Kingdom for a capacity of 70,000 metric tons per year, which capacity has permanently increased thereafter. Now, in 1976, the ethylene European production capacity is $13 \times 10^6$ metric tons per year.

Steam cracking, a widely used process, yields firstly ethylene, but also propylene and, depending on the charge, other fractions : a $C_4$ cut of high butadiene content and a $C_5^+$ cut of high aromatic hydrocarbons content, particularly benzene.

The disadvantage of these processes lies in the relatively low yields of ethylenic and propylenic hydrocarbons, which yields are substantially lower than the theoretical yields.

The present invention concerns a selective process for producing light olefinic hydrocarbons chiefly those with 2 and 3 carbon atoms respectively per molecule, particularly ethylene and propylene, which are obtained by hydrogenolysis or hydrocracking followed with steam-cracking. The charge is generally an oil cut having a distillation range between, for example, 0 and 360° C, which means that such a charge may comprise hydrocarbons in the range from those with 4 carbon atoms per molecule up to gas oil, and particularly linear and/or branched paraffinic hydrocarbons with 4 or more carbon atoms per molecule, which are quite resistant to hydrocracking reactions.

Starting with charges of this type, several processes for producing ethylene by hydrogenolysis, followed with steam-cracking, have been proposed. One of the best among these processes consists of (1) subjecting the charge, in a first step, to hydrogenolysis in the presence of an appropriate catalyst, in order to recover an effluent containing hydrogen, methane, ethane, propane and unconverted hydrocarbons with 4 or more carbon atoms per molecule ($C_4^+$) and (2) in a second step, feeding the whole effluent from the first step to a steam-cracking zone where ethane and propane are converted respectively to ethylene and propylene and the $C_4^+$ hydrocarbons are at least partly converted to ethane and propane, which in turn are further converted in situ to ethylene and propylene during the steam-cracking operation.

The major inconvenience of this process is as follows : steam-cracking is connected under rather severe conditions to obtain a maximum of conversion of the $C_4^+$ to ethane and propane. As a result thereof a substantial amount of ethane and propane present in the reaction medium is simultaneously cracked to methane instead of being converted to ethylene and propylene. The present process aims to eliminate this disadvantage by utilizing a steam-cracking zone to which no $C_4^+$ hydrocarbon is supplied. According to the invention, the steam-cracking zone is fed only with a fraction consisting of hydrocarbons with respectively 2 and 3 carbon atoms per molecule.

As to the $C_4^+$ hydrocarbons, as obtained by hydrogenolysis, they are at least partly supplied to another hydrogenolysis zone, in order to obtain an additional fraction of hydrocarbons with 2 and 3 carbon atoms per molecule to be then supplied in the steam-cracking zone.

The better charges for the production of light paraffins in the hydrogenolysis step are those which contain by weight : (1) at least 10% of normal paraffins comprising molecules with at least 4 carbon atoms per molecule and having an ASTM boiling point not exceeding 360° C., (2) at least 10% of isoparaffins with a molecular weight similar to that of the straight-chain paraffins with at least 4 carbon atoms per molecule, (3) 0 to 30% of aromatic hydrocarbons and (4) 0 to 30% of cyclic paraffins with distillation ranges similar to those of the normal and isoparaffins.

As charges, the following four hydrocarbon cuts are mentioned :

light naphthas ($C_5$ to 150° C.)
heavy naphthas ($C_5$ to 180° C.)
kerosenes (180 to 250° C.)
light gasoils (250 to 350° C.)

As concerns the hydrocracking step (hydrocracking or hydrogenolysis), the use as catalysts of molecular sieves containing a hydrogenating metal to catalyze the hydrocracking of hydrocarbons has been prior proposed. Unfortunately, with sieves having small pores (pore opening of about 5 Å) only linear hydrocarbons are cracked. If it is desired to hydrocrack other hydrocarbons liable to be converted to ethane and propane, it is preferable to use sieves with pores of larger size (for example 8 to 10 Å), but in that case the aromatic hydrocarbons which are often present in the hydrocarbon charges are also hydrogenated and thereafter cracked, which represents a loss of valuable products.

These disadvantages are avoided preferably by selectively cracking linear and branched hydrocarbons and naphthenic hydrocarbons without noticeable destruction of the aromatic hydrocarbons, which selective cracking is obtained by presulfiding of the catalyst.

The $C_2$ and $C_3$ paraffins recovered after separation of the hydrocracked effluent are thereafter subjected to steam-cracking for selective conversion to olefins.

The first hydrocracking (hydrogenolysis) step is carried out in a reaction zone preferably containing a zeolite based catalyst prepared from a "mordenite with small pores", i.e. a mordenite with a pore size of about 4 to 5 Å and which has previously been subjected to adequate acid treatment.

The object of this acid treatment is to eliminate the alkaline ions initially contained in that mordenite, which make it unsuitable to catalytic operations requiring sufficient acidity, particularly hydrocracking.

This acid treatment has also for object to enable this type of small pore mordenite to absorb normal paraffins, isoparaffins, cycloolefins and benezene, i.e. to enlarge the pores. In fact, before the acid treatment, said zeolite can only absorb in its intrinsic porosity the normal paraffins of low molecular weight such as methane, ethane and propane, and is unable to absorb isoparaffins, cycloparaffins and aromatic hydrocarbons. It may be admitted that said acid treatment has for effect, not only to impart to the catalyst adequate acidity (due to the exchange which takes place between the alkaline ions and the $H^+$ ions, the $H^+$ ions replacing the alkaline ions in the crystal structure), but also to enlarge at least a part of the pores of the structure; the isoparaffins, cycloolefins and aromatic hydrocarbons may then enter these enlarged pores.

This mordenite, in which at least about 80% of the alkaline ions have been replaced by protons, by acid treatment, is then treated with a compound of a metal having hydrogenating - dehydrogenating properties, for example a metal of group VIII of the periodic table of the elements, preferably nickel or palladium or these two associated metals, or again cobalt or a nickel-cobalt mixture. This treatment with a metal compound is so conducted as to replace partially or totally the $H^+$ ions with the ions of the hydrogenating metal (s).

The acid treatment of said mordenite (in the sodium form or previously exchanged) is carried out, for example, by treating the mordenite with a solution of an acid in water or in any other convenient solvent, of appropriate concentration, at a temperature between room temperature and the boiling temperature. It can also be operated in the presence of an acid gas.

Any acid may be used in non-limitative manner. Inorganic acids such as halogen acids (such as hydrochloric, hydrobromic, hydrofluoric, perchloric acids), nitric, sulfuric, phosphoric acids, etc. may be used, by way of examples, as well as acids of the carbon chemistry such as acetic, oxalic, citric, formic acids, etc.

It may be noted that H - mordenites subjected to one or more acid treatments are available in the trade. It is necessary that, after acid treatment, at least 80% of alkali atoms of mordenite have been replaced with $H^+$ ions.

The acid mordenite thus obtained is thereafter exchanged, so as to introduce the desired metal with hydrogenating - dehydrogenating properties. This exchange is effected in a strongly acidic medium when introducing, for example, a metal such as palladium, in not so strongly acidic medium however when introducing a metal such as nickel or cobalt.

After the exchange, the solid is dried and calcined at a temperature between about 300 and 700° C.; before use, the catalyst is treated with hydrogen, to reduce the metal compounds to the metal state; this treatment is conducted at a temperature between about 300 and 700° C.

The amount of metal present on the zeolite may range from 0.01 to 25% b.w. When using palladium, the percentage of the latter is preferably about 0.1 to 2% b.w. When using nickel or cobalt or a mixture thereof, either in the metal state or as sulfides or oxides, their total amount is preferably between 2 and 10% b.w. (as metal).

DETAILED DESCRIPTION OF THE DRAWINGS

Figure 1:
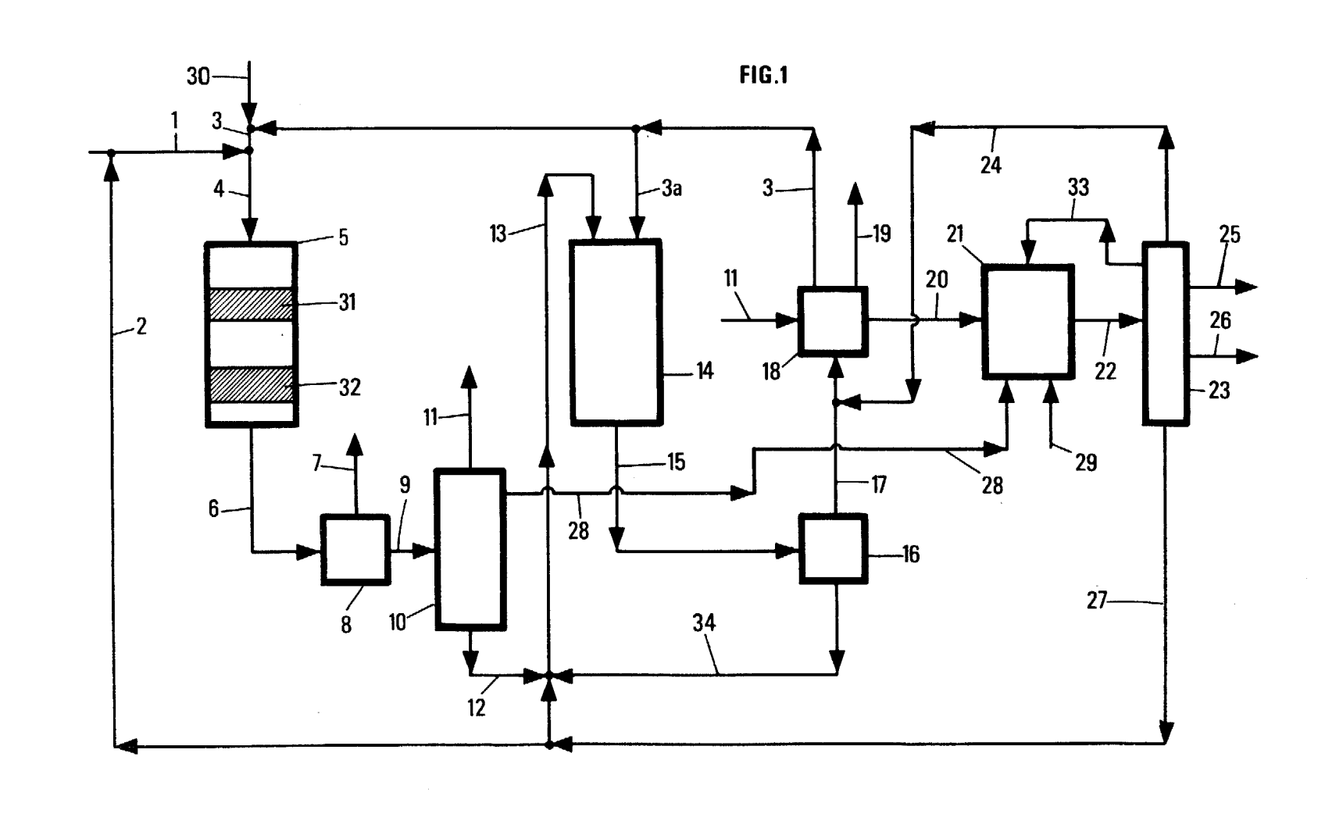
FIG. 1 is a schematic flowsheet illustrating a preferred embodiment for manufacturing ethylene and propylene wherein the charge is subjected to a hydrogenolysis reaction in the reactor 31, the effluents from this reactor being fractionated in the zone 10 in order (a) to send, through the line 28, the fraction consisting of hydrocarbons with 2 and 3 carbon atoms into the steam-cracking zone 29 and (b) to send, through the lines 12 and 13, the fraction consisting of at least 4 carbon atoms to a second hydrogenolysis zone 14. The effluent from the zone 14 is fractionated in the zone 16 so as (a) to recycle, through the lines 34 and 13, hydrocarbons with at least 4 carbon atoms, to the hydrogenolysis zone 14 and (b) to recycle, through the lines 17 and 20, hydrocarbons with 2 and 3 carbon atoms to the steam-cracking zone 29.

With reference to FIG. 1, given by way of non-limitative illustration, the charge is introduced through lines 1 and 4 into reactor 5. Fresh and recycled hydrogen is fed through the respective ducts 30 and 3. The first hydrocracking step is carried out in reactor 5. The catalyst may be used as well in fixed bed as in moving bed or in dispersed or fluid bed. On the scheme, bed 32 is a fixed bed. Bed 31 is a facultative bed of hydrodesulfurization catalyst as will be explained later.

The operating conditions for the hydrocracking reaction are preferably as follows:
  a hourly volume flow rate (VVH) between 0.2 and 5 liters of liquid hydrocarbon per liter of catalyst,
  a hydrogen flow rate between 300 and 3,000 liters of gaseous hydrogen per liter of liquid hydrocarbon charge, under normal conditions of temperature and pressure, a temperature of the reaction medium between about 300 and 550° C., a pressure between 10 and 150 bars, a mordenite catalyst as above described.

When the starting charge contains sulfur derivatives, it is usually necessary to eliminate them before the charge attains an optional second hydrocracking zone (14 on the figure) for the products which have not been cracked in reactor 5. This can be obtained by placing a bed (31) of hydrosulfurization catalyst at the top portion of the reactor (5), before the bed of hydrocracking catalyst (32).

Said zone 31 operates at temperatures and pressures similar to those used in the following proper hydrocracking zone. As hydrodesulfurization catalyst, there can be used a solid conventional catalyst able to hydrogenolyse the sulfur-carbon bonds with the formation of hydrogen sulfide which may be easily separated later from the reaction mixture in the separation zone 8 and discharged from the system through duct 7.

As the conversion in bed 32 of the charge supplied through pipe 1 to $C_2$ and $C_3$ hydrocarbons is generally incomplete, the product discharged from hydrocracking zone 5 is passed through ducts 6 and 9 to a separation zone 10 for elimination of methane and possibly hydrogen through duct 11 (with possibility to pass them, if desired, to the next zone 18). $C_2$ and $C_3$ saturated hydrocarbons (ethane, propane) lighter than butane ($C_4$) are discharged through duct 28. The $C_4^+$ hydrocarbons (butanes and heavier hydrocarbons) are supplied through ducts 12 and 13 to a second hydrocracking zone 14. In zone 14, these $C_4$ hydrocarbons (butanes and heavier hydrocarbons) are contacted, in the presence of hydrogen, with an exchanged mordenite containing catalyst, as described above, or with a conventional hydrogenolysis catalyst, i.e. a catalyst containing one metal or two or more associated metals of group VIII, VI B or VII B of the periodic classification of elements, deposited on a carrier of sufficient surface and volume, such as, for example, alumina, silica, alumina-silica, zeolite, etc ; when using a zeolite, the metal (s) may be introduced by appropriate exchange.

The metals are, for example, palladium, iridium, tungsten, rhenium, cobalt, nickel, etc. used alone or as mixtures. The metal concentrations are roughly the same as those in the first hydrogenolysis step, preferably 0.0.1 to 10% b.w. In that second hydrogenolysis step (14), the metals of the catalyst may be in the metal state since the charge no more contains sulfur derivatives.

The operating conditions to be adopted here are similar to those used in the first reaction zone 5, although they may be more severe (for instance, higher temperature) if necessary to good running of the plant.

The products discharged through duct 15 from this second hydrocracking unit 14 are conveyed to a zone 16 for separating hydrogen excess together with hydrocarbons lighter than butanes.

Thus a mixture of hydrogen with methane, ethane and propane is supplied through duct 17 to a separation zone 18; the whole amount of $C_2$ and $C_3$ hydrocarbons is recovered and supplied through duct 20 to a steam-cracking zone 21 in admixture with ethane and propane obtained in the separation zone 10 and which are also fed through duct 28 to the said steam-cracking zone 21.

In said steam-cracking zone 21, ethane and propane are converted to ethylene and propylene which are the desired products.

In the separation zone 18, unconsumed hydrogen is also seperated through ducts 3 and 3a; it is recycled to the hydrocgenolysis zones 5 and 14; methane is discharged through duct 19.

In the steam-cracking zone 21, ethane and propane are subjected to preferred temperatures of about 700 to 850° C., the residence time at this temperature being, for example, between 0.2 and 1.2 second.

This steam-cracking is carried out in the presence of steam introduced through duct 29 into zone 21. The amount of steam depends on the molecular weight of the charge (it is usually expressed as weight of steam per weight of charge).

Pressure is unfavourable to the cracking reactions and exerts a positive effect on the secondary reactions leading to the production of aromatics and coke. The partial hydrocarbon pressure in the steam-cracking zone influences the reaction balance and reaction velocity, and thus the distribution of the resulting products. These reactions are of higher order than the primary reactions; in order to disfavour them with respect to the latter it is necessary to "dilute" the whole, i.e. to decrease the partial hydrocarbon pressure in the charge. This dilution reduces the speed of all the reactions, but above all of those which are the most sensitive to the concentration, i.e. the secondary reactions.

The influence of steam in steam-cracking in this first to decrease the hydrocarbon partial pressure, further to bring other beneficial effects due to the high thermal conductivity of steam, which makes the thermal exchanges easier, and due to the heat capacity of steam resulting in a heat supply, etc.

In the present case, where essentially ethane and propane are cracked, the operation is conducted at a preferred pressure of from about 0.1 to 1.4 bars with a ratio b.w. of water to hydrocarbon preferably of from 0.25 to 0.4.

The products discharged from the steam-cracking zone 21 are passed through duct 22 to a separation zone 23 wherefrom a mixture of methane and hydrogen produced by steam-cracking is discharged from the top through duct 24.

This mixture is supplied, through ducts 24 and 17, to the separation zone 18 to obtain hydrogen of purity higher than 78% (by mole), which may be supplied to the hydrocracking zones 5 and 14 through ducts 3 and 3a.

Other products discharged from the said separation zone 23 are ethylene through duct 25 and propylene through duct 26.

A product consisting of substances heavier than propylene is recovered from the bottom of this separation zone 23; this product consists of hydrocarbons with 4 or more carbon atoms per molecule; it is discharged through duct 27 and may be usefully recycled, at least in part, to any one of the hydrogenolysis zones 5 or 14 or to both.

The $C_2$ and $C_3$ paraffins which have not been converted by steam-cracking are recycled through duct 33 to the steam-cracking zone 21.

An improvement of the invention consists of using a steam-cracking zone associated with at least 3 serially arranged hydrogenolysis or hydrocracking zones. The effluent discharged from each hydrogenolysis zone is fractionated to recover, among others, (a) a cut containing ethane and propane, which is the single cut supplied to steam-cracking, and (b) a cut containing $C_4$ hydrocarbons, which is either passed to the subsequent hydrogenolysis zone in order to obtain an additional ethane-propane cut to be fed to the steam-cracking zone, or recycled to the any one of the preceding hydrogenolysis zones.

According to this improvement, it is important to operate each hydrogenolysis zone successively traversed by the charge at a temperature from 5 to 25° C. higher than the temperature of the preceding hydrogenolysis zone. It is also mandatory that, in the first hydrogenolysis zone traversed by the charge the catalyst be of the acid mordenite type and contain at least than 0.01 to 25% b.w. of at least one non-noble metal of group VIII (nickel, cobalt . . . ) of the periodic chart of elements, and that, in the other hydrogenolysis zones, the catalyst contain at least 0.01 to 25% b.w. of a noble metal of the platinum family, deposited on a carrier selected from silica, alumina, alumina-silica, the zeolites and mordenites.

Figure 2:
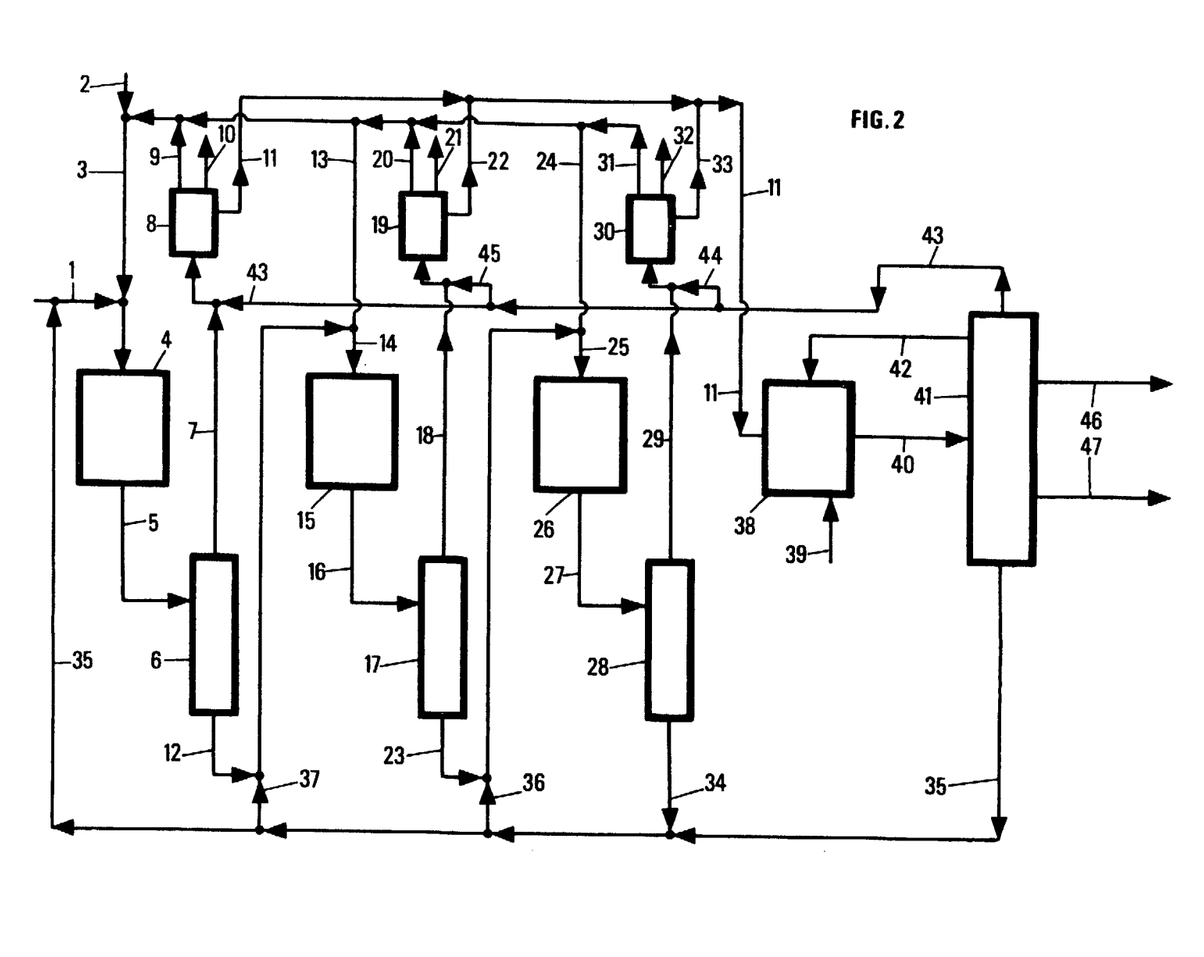
FIG. 2 is a schematic flowsheet of preferred embodiment for manufacturing ethylene and propylene wherein the charge is treated successively in 3 serially arranged hydrogenolysis zones 4, 15 and 26. The effluents from each hydrogenolysis zones 4, 15 and 26 are respectively subjected to separations in the zones 16, 17 and 28 in order to collect (a), through the lines 7, 18 and 29, three fractions containing ethane and propane, these fractions being fractionated so as to obtain three cuts consisting of ethane and propane which are sent through the lines 11, 22 and 33 towards the steam cracking zone 39 and (b), through the lines 12, 23 and 28, three $C_4+$ cuts which are recycled towards one of the hydrogenolysis zones 4, 15 and 26.

FIG. 2 is given by way of non-limitative illustration. The charge is supplied through duct 1 to the first hydrogenolysis reactor 4. Fresh hydrogen and recycled hydrogen are supplied through ducts 2 and 3.

The catalyst of the hydrogenolysis reactor 4, as well as that of the following hydrogenolysis reactors 15 and 26, may be used in fixed, fluid or moving bed. The catalyst of reactor 4 contains zeolite and is preferably prepared according to the previously described acid treatment.

Whenever the charge to be treated comprises sulfur derivatives, it is necessary to remove them by first subjecting the charge to a conventional hydrodesulfurization reaction.

The effluent from the first hydrogenolysis zone 4 is discharged through duct 5 and supplied to a separation zone 6 to obtain, through duct 7, a mixture consisting essentially of hydrogen, methane, ethane, propane and, through duct 12, $C_4^+$ hydrocarbons. The mixture of pipe 7 is supplied to a separation zone 8 where, by any adequate means (for example, utilization of a cold box system, not shown on the figure), there is separated (a) through duct 9, excess hydrogen which has not been used in zone 4 and is recycled through duct 3 to the hydrogenolysis zone 4, (b) through duct 10, methane which may be used as heating gas, and (c) through duct 11, a mixture of ethane and propane which is passed to the steam-cracking zone 38.

A mixture of hydrogen and methane recovered through duct 43 from the separation zone 41 located behind the steam-cracking zone 38 is also supplied to the separation zone 8.

The $C_4^+$ hydrocarbons of pipe 12 are passed through duct 14 to a second hydrogenolysis zone 15, together with recycle hydrogen from duct 13 and optionally fresh hydrogen (not shown on the figure). This second hydrogenolysis zone 15 is operated at higher temperature than in zone 4, and the subsequent hydrogenolysis zones (a third hydrogenolysis zone 26 appears on the figure) are operted at higher temperature than in the second hydrogenolysis zone 15. The catalyst used in the second hydrogenolysis zone 15 and in the following zones (zone 26 on figure 2) contains at least 0.01 to 25% b.w. of a noble metal from the platinum family and possibly 0.01 to 25% b.w. of a second metal selected from the noble and non-noble metals from group VIII (cobalt, nickel) and the metals from groups VI B (molybedenum, tungsten) and VII B (manganese, rhenium). The amount of noble metal present in the catalyst is preferably between 0.1 and 2% b.w. The content of optional second metal, if this metal is not a noble metal from the platinum family, is preferably from 0.01 to 10% b.w. (expressed as metal). The presence, in the first hydrogenolysis reactor, of a noble metal from the platinum family is not always desirable, since this presence would make the hydrocracking in that reactor 4 non-selective, particularly if the charge contains sulfur compounds. Conversely, in the other hydrogenolysis reactors such as 15 and 26, the presence of a noble metal from the platinum family is necessary, since such a catalyst containing a noble metal is largely more active and, above all, permits to crack the aromtic hydrocarbons which were not substantially converted in the first hydrogenolysis zone 4. The carrier of the catalyst in the hydrogenolysis zones other than the first one is selected from silica, alumina, alumina-silica, the zeolites and mordenites.

The effluent from the hydrogenolysis zone 15 is discharged through duct 16 and supplied to the separation zone 17 wherefrom are discharged, through duct 23, $C_4^+$ hydrocarbons, which are fed through duct 25 to the third hydrogenolysis zone 26, together with recycled hydrogen from duct 24, with possible admission of fresh hydrogen through a duct not shown on the drawing. A mixture of hydrogen, methane, ethane and propane is also discharged from the separation zone 17 through duct 18; it is admixed with hydrogen and methane fed from ducts 43 and 45 and passed to the separation zone 19. In the same way as in the separation zone 8, there is discharged (a) through duct 20, hydrogen which is fed through ducts 13 and 3 to any one or the two hydrogenolysis zones 4 and 15, (b) methane, through duct 21, which may be used as heating gas, (c) through duct 22, a mixture of ethane and propane to be fed through duct 11 to the steam-cracking zone 38.

The effluent from the third hydrogenolysis zone 26 is discharged through duct 27 and supplied to the separation zone 28 wherefrom there is discharged, through duct 34, $C_4^+$ hydrocarbons which are recycled through ducts 35, 36 and 37, to any one of the three hydrogenolysis zones 4, 15 or 26, or to the three zones. A mixture of hydrogen, methane, ethane and propane is also discharged from the separation zone 28 through duct 29; it is admixed with hydrogen and methane from duct 44 and fed to the separation zone 30, from where are discharged, just as from the separation zones 8 and 19, (a) through duct 31, hydrogen which is fed through ducts 24, 13 and 3 to any one of these three hydrogenolysis zones 4, 15 and 26 or to the three zones together, (b) through duct 32, methane which may be used as heating gas, (c) through duct 33, ethane and propane which are passed through duct 11 to the steam-cracking zone 38, together with mixtures of ethane and propane from ducts 11 and 22, as recovered respectively from the two separation zones 8 and 19 following the two first hydrogenolysis zones 4 and 15.

The catalysts of the hydrogenolysis zones other than the first one may be identical or not. A system with 3 hydrogenolysis reactors may be designed, where the charge meets successively 3 catalysts of increased selectivity, for example, in the first reactor, a catalyst containing nickel or a mixture nickel-cobalt as metal, in the second reactor a catalyst containing platinum or iridium as metal and, in the third reactor, a catalyst containing iridium and rhenium or manganese as metals.

Steam-cracking operates in the presence of steam introduced through duct 39 into zone 38.

The products discharged through duct 40 from the steam-cracking zone 38 are fed to the separation zone 41 from the top of which is discharged, through duct 43, a mixture of hydrogen and methane produced during the steam-cracking operation. This mixture is fed through ducts 43, 44 and 45 to any of one or to all the separation zones 30, 19 and 8 where is obtained hydrogen of purity higher than 70% molar, which is passed, as above indicated, to at least one of the hydrocracking zones 4, 15 and 26.

From the separation zone 41, there is also discharged as products: ethylene through duct 46 and propylene through duct 47.

Ethane and propane which have not been transformed by steam-cracking are recycled through duct 42 to the steam-cracking zone 38.

There is finally recovered, through duct 35, $C_4^+$ hydrocarbons with 4 or more carbon atoms per molecule which have been formed by steam-cracking: they consist, depending on the charge, of butadiene and a $C_5^+$ cut of high aromatic hydrocarbon content, particularly benzene. These $C_4^+$ hydrocarbons are recycled to at least one of the hydrogenolysis zones 4, 15 or 26 through ducts 35, 37 and/or 36. Butadiene and benzene may be recovered as final products.

EXAMPLE 1

An essentially paraffinic light gasoline cut with more than 4 carbon atoms per molecule and containing only 2% b.w. of benzene, having a distillation range of 25–110° C. and a specific gravity of 0.685, is treated according to the present invention. The sulfur content is lower than 5 ppm.

The process of FIG. 1 is used as reference for the description of this example, except that the hydrodesulfurization bed 31 is omitted. In a first step, this light gasoline cut is contacted in the first hydrogenolysis zone 5 (fixed catalyst bed 32) with a catalyst prepared as follows:

100 g of granular small pore (5 Å) sodium mordenite, of the formula $Na_2O$, $Al_2O_3$, 10 $SiO_2$, n $H_2O$, are immersed into 1,000 cc of an aqueous solution of 112 g ammonium chloride. The mixture is gently stirred at room temperature for 6 hours. The solution is separated by filtration and replaced by a fresh solution with which is effected a second exchange operation identical to the preceding one. After filtration, the solid is dried and then calcined for 2 hours at 600° C. It is then dipped into a molar hydrochloric acid solution for 2 hours. The solid is neutralized with ammonia and then thoroughly washed with distilled water so as to remove any trace of free ammonia. It is then dipped into 500 cc of a molar aqueous solution of nickel nitrate for 6 hours at room temperature. During this exchange, care must be taken to avoid that the pH of the solution be higher than 5. A second identical exchange is effected. After washing, filtering and drying at 100° C., the product is calcined in air at 650° C. for 3 hours. The catalyst contains 2.5% b.w. of nickel.

The so-prepared catalyst is reduced by means of a hydrogen stream of 1,500 liters hydrogen per liter of catalyst per hour at 500° C. under an absolute pressure of 20 bars, for 8 hours. A mixture of hydrogen and the light cut to be treated is passed over this catalyst in reactor 5 at the temperature of 350° C. under a pressure of 50 bars absolute, at a rate of 5 moles of hydrogen per mole of hydrocarbon. The flow rate is 1 liter of liquid hydrocarbon per liter of catalyst per hour. The ratio $H_2/H_c$ is about 1,500 liters gaseous $H_2$ per liter of liquid charge.

The product from zone 5 is supplied to the separation zone 10 (the separation zone 8 is not necessary) where the products are separated as follows:

(a) the resulting methane (3.5% b.w.) and excess hydrogen through duct 11.

(b) the resulting mixture of saturated $C_2$ and $C_3$ (amounting respectively to 6.5% and 32% b.w. of the charge treated according to the present invention) which are passed through duct 28 to the steam-cracking zone 21.

(c) the products which were not converted to hydrocarbons lighter than butanes, i.e. a product containing $C_4^+$ hydrocarbons, from the column bottom (duct 12), this product amounting to 58% b.w. of the initial charge.

These products are fed through duct 12 to a second hydrogenolysis zone 14 where the charge is contacted, in the presence of hydrogen, with a solid catalyst which, in the present example, is a transition alumina containing 0.3% b.w. of iridium associated with 0.2% b.w. of rhenium.

The operating conditions are the following:

volume feed rate: 1 volume of liquid charge per volume of catalyst per hour, hydrogen/hydrocarbon ratio: 5 moles hydrogen per hydrocarbon mole ($H_2$/HC is 1,500 liters gaseous hydrogen per liter of liquid charge), pressure: 50 bars, temperature: 360° C.

The products discharged from reactor 14 are supplied through duct 15 to a separation zone 16 where are separated: (a) through duct 17, a fraction containing excess hydrogen, methane, ethane and propane, and (b) hydrocarbons with 4 or more carbon atoms per molecule ($C_4^+$).

These $C_4^+$ hydrocarbons, amounting to 33.6% b.w. of the initial charge (fed through duct 1 to the reaction zone 5), are recycled through duct 34 to the second hydrocracking zone 14.

The light fraction of duct 17 containing excess hydrogen, the produced methane, and both ethane and propane is fed to a second separation zone 18 to separate:

1° a cut (duct 20) containing exclusively ethane (3.8% b.w.) and propane (18.6% b.w.), 2° a fraction consisting of hydrogen of more than 85% molar purity (duct 3), 3° a methane fraction (duct 19) produced in the course of the operation.

Hydrogen of pipe 3 is supplied, through ducts 3 or 3a, to the hydrocracking zones 5 and 14. Fresh hydrogen is fed through duct 30 to reactor 5 to compensate for hydrogen consumed in the two hydrocracking reactions. Methane of duct 19 may be used as combustible. This methane amounts to 5.6% b.w. of the total charge fed through duct 1.

Thus the steam-cracking zone 21 is fed through ducts 20 and 28 with the whole amount of propane and ethane obtained in zones 5 and 14, corresponding to 50.6% of propane and 10.3% of ethane b.w. of the total charge treated according to the invention.

In the steam-cracking zone 21, the hydrocarbon charge consisting of ethane and propane is heated to 780° C. in the presence of steam supplied through duct 29 in such amount that the ratio by mole of steam to hydrocarbons is 0.2. The outlet pressure is 0.5 bar.

The products discharged from zone 21 are abruptly chilled and pass through line 22 to a separation zone 23 to obtain the desired products, i.e. ethylene and propylene.

A gas cut consisting of hydrogen (1.7% b.w. of the initial charge) and methane (27.8% b.w. of the charge of line 22) is obtained from the top of the separation zone 23, through duct 24. These two constituents, formed by steam-cracking, are passed through duct 24 to the separation zone 18 to separate methane from hydrogen, so as to obtain sufficiently pure hydrogen (>85% mol.) to be used in the hydrogenolysis zones 5 and 14.

As the conversion in zone 21 is not complete, unreacted ethane and propane are recovered and recycled through duct 33 to the steam-cracking zone 21.

Ethylene and propylene are discharged through ducts 25 and 26 respectively. 46.6% b.w. of ethylene and 15.5% b.w. of propylene are obtained, these amounts being based on the total hydrocarbon cut treated according to the present invention.

Heavier products with more than 3 carbon atoms per molecule, formed by steam-cracking, are discharged from the bottom of the column.

This heavy fraction, amounting to 5.1% b.w. of the total charge, is fed through ducts 27 and 2 in substantially equal amounts to each of the hydrocracking zones 5 and 14.

Thus, by treating the initial cut according to the invention, an excellent yield of ethylene and propylene is obtained and the whole charge is converted during the process. In addition to ethylene and propylene, there is also obtained hydrogen of satisfactory purity, which is used in the hydrogenolysis zones. Methane may be used as heating gas.

The total yields are given in % with respect to the total initial charge:
 1.7% b.w. of hydrogen (duct 24)
 36.2% b.w. of methane (duct 19)
 46.6% b.w. of ethylene (duct 25)
 15.5% b.w. of propylene (duct 26).

EXAMPLE 1A (for comparison)

The charge of example 1 is subjected to hydrocracking in one single zone under operating conditions indential to those of the first hydrocracking zone 5 of example 1 and in the presence of the same catalyst.

At the outlet of the hydrocracking zone, and after separation of the 3.5% of the methane formed, as well as of the excess hydrogen, there is obtained a product amounting to 96.5% of the treated charge and containing 6.5% b.w. of ethane and 32% b.w. of propane, the remainder (up to 100%) consisting of hydrocarbons heavier than propane. The whole product represents 96.5% of the initial charge; it is supplied directly to the steam-cracking zone where it is subjected to the same conditions as those of example 1.

The products discharged from the steam-cracking zone are then fed to a separation zone, as in example 1. The $C_4^+$ products are recycled to the hydrocraking unit. The yields of hydrogen, methane, ethylene and propylene are given in the following Table I. By way of comparison, the yields obtained in example 1 are also reported in this table I.

TABLE I

| YIELDS % B.W. | EXAMPLE 1 | EXAMPLE 1 - A (comparison) |
|---|---|---|
| Hydrogen | 1.7 | 1.3 |
| Methane | 36.2 | 40.4 |
| Ethylene | 46.6 | 42.9 |
| Propylene | 15.5 | 15.4 |
| Ethylene + Propylene | 62.1 | 58.3 |

By inspection of Table I, it can be remarked that:
 the yield of $C_2 + C_3$ olefins and the ethylene yield are higher when operating according to the invention.
 Methane is formed in lower amount when operating according to the invention.
 the hydrogen yield is higher when operating according to the invention, thus reducing the amount of additional hydrogen to be introduced into the system.

EXAMPLE 2

A gas oil cut of 200°-350° C. boiling range, 0.865 specific gravity, 220 average molecular weight and 0.12% b.w. sulfur content is treated.

The operation is substantially the same as in example 1, according to the process of FIG. 1, with the following difference: in the present example, the first hydrocracking zone 5 containing a bed 32 of exchanged mordenite, prepared as in example 1, also comprises in its upper portion, a catalyst bed 31 for hydrodecomposing the sulfur-carbon bonds, in view of desulfurizing the charge. This hydrosulfurization catalyst is based on alumina and contains 0.35% of platinum. The charge successively traverses the bed 31, and then the bed 32 (both of the fixed bed type).

The catalyst of bed 31 is previously sulfurized by means of a mixture of hydrogen and hydrogen sulfide, this mixture containing 0.1% by volume of $H_2S$ and being fed at a rate of 400 liters per liter of catalyst per hour at 350° C. under an absolute pressure of 20 bars. 5% of $H_2S$ with respect to the catalyst is used for sulfiding.

The operating conditions in the hydrocracking zones 5 and 14 are the same as in example 1; the temperatures are 350° C. in the hydrodesulfurization zone 31 and the first hydrocracking zone 32 and 360° C. in the second hydrocracking zone.

A first separation zone 8 is placed between the two reactors 5 and 14; the products discharged from the first hydrodesulfurization-cracking reactor 5 are made free, through duct 7, of hydrogen sulfide produced by destruction of the sulfur compounds of the treated charge.

At the outlet from this separation zone 8, the resulting products (duct 9) have a sulfur content lower than 2 ppm. These products are then subjected to the same treatments as those described in example 1 (steam-cracking and various separations). The results obtained are given in Table II.

EXAMPLE 2A (for comparison)

The gas oil cut of example 2 is subjected as in example 2, to a hydrodesulfurization-hydrocracking treatment in reactor 5 comprising the 2 catalytic beds 31 and 32. The operating conditions are the same as in example 2.

At the outlet from reactor 5, the resulting products are passed through a separator 8 for removing the hydrogen sulfide contained therein, and then passed directly, without other fractionation, to a steam-cracking zone operated as example 1. The $C_4^+$ products discharged from the steam-cracking are recycled to the hydrocracking unit. The following Table II gives the hydrogen, methane, ethylene and propylene yields obtained by steam-cracking. The yields obtained in example 2 are also reported in this table II by way of comparison.

TABLE II

| YIELDS % b.w. OF THE CHARGE | EXAMPLE 2 | EXAMPLE 2 - A (comparison) |
|---|---|---|
| Hydrogen | 1.5 | 0.8 |
| Methane | 33.5 | 41.3 |
| Ethylene | 50.8 | 43.6 |
| Propylene | 14.2 | 14.3 |
| Ethylene + Propylene | 65.0 | 57.9 |

By insepction of this Table II, the same remarks can be made as by inspection of Table I.

What we claim is:

1. A process for manufacturing ethylene and propylene from a charge having a distillation point lower than about 360° C. and containing at least normal and iso-paraffins having at least 4 carbon atoms per molecule, wherein:
    (a) said charge is subjected to a hydrogenolysis reaction in a hydrogenolysis zone, in the presence of a catalyst of the acid mordenite type with at least 0.01 to 25% b.w. of at least one group VIII metal,
    (b) the effluents from the hydrogenolysis reaction are fed to a separation zone from which are discharged (α), from the top, methane and possibly hydrogen, (β) a fraction consisting essentially of hydrocarbons with 2 and 3 carbon atoms per molecule, and (λ), from the bottom, a fraction consisting essentially of hydrocarbons with at least 4 carbon atoms per molecule,
    (c) only said fraction consisting essentially of hydrocarbons with 2 and 3 carbon atoms per molecule is fed to a steam-cracking zone, in the presence of steam, to transform at least a portion of the hydrocarbons with 2 and 3 carbon atoms per molecule to monoolefinic hydrocarbons; said fraction consisting essentially of hydrocarbons with at least 4 carbon atoms per molecule, obtained from the bottom of said separation zone, is supplied to a second hydrogenolysis zone where it is treated in the presence of a catalyst containing at least 0.01 to 25% b.w. of at least one metal of group VIII, VI B or VII B, the effluent from the second hydrogenolysis zone is supplied to a separation zone to discharge, on the one hand, hydrocarbons with at least 4 carbon atoms per molecule which are recycled at least partly to the said second hydrogenolysis zone, and, on the other hand, a fraction consisting essentially of a mixture of hydrogen, methane and saturated hydrocarbons with 2 and 3 carbon atoms per molecule; a hydrogen stream and a methane stream are separated from said mixture and there is fed to said steam-cracking zone the hydrocarbons of said mixture with 2 and 3 carbon atoms, together with said fraction consisting essentially of hydrocarbons with 2 and 3 carbon atoms per molecule as recovered from said separation zone following the first hydrogenolysis zone, and there are thus obtained at the outlet of the steam-cracking zone, in addition to a stream of methane and hydrogen and a stream of paraffinic hydrocarbons with 2 and 3 carbon atoms per molecule, on the one hand, olefins with 2 and 3 carbon atoms per molecule and, on the other hand, products with at least 4 carbon atoms per molecule.

2. A process according to claim 1, wherein, in the first hydrogenolysis zone, small pore mordenite is used as catalyst, the pore opening being about 4 to 5 Å, which small pore mordenite has been acid treated before use, particularly in order to enlarge said pores at least partially, and has also been treated firstly to eliminate at least about 80% of its alkali metal atoms, and secondly to contain 0.01 to 25% b.w. of at least one metal of group VIII.

3. A process according to claim 1, wherein, the charge, when containing sulfur compounds, is subjected to hydrodesulfurization before the first hydrogenolysis reaction.

4. A process according to claim 1, wherein the products which comprise at least 4 carbon atoms per molecule, as recovered from the steam-cracking, are at least partly recycled either to the first or to the second hydrogenolysis zone or to both.

5. A process according to claim 1, wherein the hydrogen stream of the said mixture of hydrogen, methane and saturated hydrocarbons with 2 and 3 carbon atoms per molecule is recycled at least partly either to the first or to the second hydrogenolysis zones, or to both.

6. A process according to claim 1, wherein the charge is selected from the light naphthas, the heavy naphthas, the kerosenes and the light gas oils.

7. A process according to claim 1, wherein the metal of the catalyst of the first hydrogenolysis zone is selected from nickel, palladium, cobalt and the nickel-palladium and nickle-cobalt associations.

8. A process according to claim 1, wherein the metal or metals of the catalyst used in the second hydrogenolysis zone is deposited on a carrier selected from the silicas, the aluminas, the alumina-silicas, the zeolites and the mordenites.

9. A process for manufacturing ethylene from a hydrocarbon charge having a distillation range between 0 and 360° C. and containing at least normal and iso-paraffins with at least 4 carbon atoms per molecule, wherein said charge is treated successively in at least 3 serially arranged hydrogenolysis or hydrocracking zones operated at a temperature between 300 and 550° C., the temperature of each of said hydrogenolysis or hydrocracking zones, other than the first hydrogenolysis zone, exceeding by about 5 to 25° C. the temperature of the hydrogenolysis zone previously traversed by the charge, said first hydrogenolysis or hydrocracking zone traversed by the charge containing a catalyst of the acid mordenite type containing 0.01 to 25% of at least one metal from group VIII of the periodic chart of the elements selected from nickel, cobalt and iron, the other said hydrogenolysis zones containing 0.01 to 25% of at least one noble metal of the platinum family deposited on a carrier, which carrier is selected from silicas, aluminas, alumina-silicas, zeolites and mordenites, the effluent from each hydrogenolysis zone being subjected to a series of separations, so as to collect, in addition to a stream of hydrogen and a stream of methane, on the one hand, a cut consisting essentially of ethane and propane and, on the other hand, a cut of $C_4^+$ hydrocarbons having 4 or more carbon atoms per molecule, said $C_4^+$ cut being either fed to the subsequent hydrogenolysis zone or, if said $C_4^+$ cut is that discharged from the last hydrogenolysis zone traversed by the charge, recycled to at least one of the preceding hydrogenolysis zones, all the cuts consisting essentially of ethane and propane being joined and supplied to a steam-cracking zone, in the presence of steam, the effluent from the steam-cracking zone being supplied to a separation zone, from which are discharged:
(a) a stream of methane and hydrogen which is at least partly recycled to said series of separations of the effluents from the hydrogenolysis zones,
(b) a stream consisting essentially of unconverted ethane and propane, which is recycled to the steam-cracking zone,
(c) ethylene,
(d) propylene,
(e) hydrocarbons formed during the steam-cracking reaction and comprising at least 4 carbon atoms per molecule, which are at least partly recycled to at least one of the hydrogenolysis reaction zones.

10. A process according to claim 9, wherein hydrogen collected in the series of separations of the effluents from the hydrogenolysis zones is recycled to at least one of said hydrogenolysis zones.

11. A process according to claim 9, as applied to the manufacture of ethylene from a charge selected from the light naphthas, the heavy naphthas, the kerosenes and the light gas oils of distillation point lower than about 360° C.

12. A process according to claim 11, wherein the catalyst of the first hydrogenolysis zone contains nickel or nickel and cobalt, and wherein the catalysts of the other hydrogenolysis zones, either identical or not, contain 0.1 to 2% of a noble metal of the platinum family and 0.01 to 10% of a metal selected from molybdenum, tungsten, manganese and rhenium.

13. A process according to claim 12, wherein the catalyst of the hydrogenolysis zones other than the first hydrogenolysis zone contains iridium and rhenium.

14. A process according to claim 9, wherein three hydrogenolysis zones are present.

15. A process according to claim 9, wherein the charge contains sulfur compounds and is subjected to a hydrodesulfurization reaction before being introduced into the first hydrogenolysis zone.

16. A process according to claim 14, wherein the catalyst of the first hydrogenolysis zone contains nickle or nickel and cobalt, the catalyst of the second hydrogenolysis zone contains platinum or iridium and the catalyst of the third hydrogenolysis zone contains iridium and rhenium or manganese.

* * * * *